United States Patent
Mohr et al.

(10) Patent No.: US 6,792,843 B2
(45) Date of Patent: Sep. 21, 2004

(54) ARMOR-PLATING COMPOSITE

(75) Inventors: Michael Mohr, Wuppertal (DE); Carsten Geitz, Wuppertal (DE); Jorg Wintersieg, Wuppertal (DE)

(73) Assignee: Teijin Twaron GmbH, Wuppetal (DE)

( * ) Notice: Subject to any disclaimer, the term of this patent is extended or adjusted under 35 U.S.C. 154(b) by 0 days.

(21) Appl. No.: 10/276,070

(22) PCT Filed: May 5, 2001

(86) PCT No.: PCT/EP01/05114
§ 371 (c)(1), (2), (4) Date: Nov. 12, 2002

(87) PCT Pub. No.: WO01/85443
PCT Pub. Date: Nov. 15, 2001

(65) Prior Publication Data
US 2003/0110932 A1 Jun. 19, 2003

(51) Int. Cl.[7] .................................. F41H 5/04
(52) U.S. Cl. ...................... 89/36.02; 89/36.08
(58) Field of Search ............ 89/36.02, 36.05, 89/36.08, 36.12; 109/49.5; 2/2.5

(56) References Cited

U.S. PATENT DOCUMENTS

| | | | |
|---|---|---|---|
| 2,723,214 A | 11/1955 | Meyer | 89/36.02 |
| 3,431,818 A | 3/1969 | King | |
| 4,241,457 A | 12/1980 | Klein et al. | 2/2.5 |
| 4,633,756 A * | 1/1987 | Rudoi | 89/36.02 |
| 5,191,166 A | 3/1993 | Smirlock et al. | 89/36.02 |
| 5,915,528 A * | 6/1999 | Shmuelov | 2/2.5 |
| 5,976,656 A * | 11/1999 | Giraud | 428/44 |
| 6,082,240 A * | 7/2000 | Middione et al. | 89/36.08 |

FOREIGN PATENT DOCUMENTS

| | | | |
|---|---|---|---|
| CH | 666 958 A5 * | 8/1988 | |
| DE | 1 178 328 | 9/1964 | |
| DE | 1 211 094 | 2/1966 | |
| DE | 1 578 324 | 1/1970 | |
| DE | 1 428 744 | 3/1972 | |
| DE | 26 59 727 A1 | 7/1978 | |
| DE | 31 34 341 A1 * | 5/1982 | |
| DE | 35 08 848 A1 | 9/1986 | |
| DE | 23 59 122 C1 | 12/1987 | |
| DE | 39 37 087 A1 | 5/1991 | |
| DE | 41 14 809 A1 | 11/1992 | |
| DE | 43 10 737 A1 | 10/1994 | |
| EP | 0 678 724 A1 | 10/1995 | |
| GB | 663 * | 2/1874 | 89/36.02 |
| GB | 1260111 | 1/1972 | |
| WO | WO 93/21492 * | 10/1993 | |
| WO | WO 96/29561 | 9/1996 | |

* cited by examiner

Primary Examiner—Stephen M. Johnson
(74) Attorney, Agent, or Firm—Oliff & Berridge, PLC

(57) ABSTRACT

A composite material for armor plating with improved multihit behavior includes at least: a front layer, facing the impact side and mounted on a first sub-layer, the front layer including a plurality of neighboring front-layer segments with form-fit contact between adjacent segments; a rear layer facing away from the impact side; and a supporting layer disposed between the front and rear layers. The supporting layer includes a plurality of supporting-layer segments, which present a surface parallel to the front layer whose area is the same as or less than the area of the front-layer segments parallel to the front layer.

15 Claims, 3 Drawing Sheets

ARMOR-PLATING COMPOSITE

BACKGROUND OF THE INVENTION

1. Field of the Invention

The invention relates to a composite armor-plating material comprising at least: a front layer, facing the impact side and mounted on a first sub-layer, the front layer consisting of a plurality of neighboring front-layer segments with form-fit contact between adjacent segments; a rear layer facing away from the impact side; and a supporting layer disposed between the front layer and the rear layer.

2. Discussion of Related Art

Composite armor-plating materials of this type are used for protection against projectiles and the use of explosives, e.g., in armor-plated vehicles, or for the protection of persons and/or objects in railway stations, airports or public buildings.

Thus DE-A-39 37 087 discloses an armor-plated component in which the armor plate is mounted on a lightweight supporting element and provided with a covering layer on is its front side. The armor plate consists of a ceramic composite with a sub-layer of aramid or glass-reinforced plastic on the rear face. The supporting element can be of a lightweight material such as aluminum, wood or similar, or it can be produced from a material incorporating cavities, such as perforated plates or rigid foam. Armor plating of this type is claimed to provide effective protection.

WO 96/29561 discloses a multilayered armor-plating material that is constructed from an optionally monolithic or multicomponent ceramic or metallic front layer backed by a hard supporting layer. In this patent, synthetic resin laminated wood is used as the supporting layer. Furthermore, the synthetic resin laminated wood layer may carry an additional layer on the side facing away from the front armor-plating; this additional layer may be made of, in particular, armor-plating steel, a duralumin material, a titanium alloy, a GRP or an aramid laminate. This structure is claimed to provide a multilayer armor-plating material that is lightweight, rigid and reasonably priced. It is for all practical purposes not delaminated, even in the impact region, when subjected to high stress, and is moreover capable of dissipating energy.

When testing the penetration resistance properties of material in accordance with DIN EN 1522, a dispersion pattern in the form of an equilateral triangle is imposed as an additional condition in order to investigate the multihit behavior of the armor plating. According to the currently valid regulations, the side length of the triangle must be 120±10 mm.

According to WO 96/29561, the multihit capability of the composite armor-plating material disclosed therein is superior to that of a structure in which a GRP layer is used instead of the synthetic resin laminated wood layer. It has been suggested in WO 96/29561 that the permissible dispersion is roughly half of that in an optimized ceramic/GRP and/or aramid composite of the usual construction. However, WO 96/29561 contains no test results, so that no conclusions can be drawn on the actually attainable multihit behavior of the structure disclosed therein.

U.S. Pat. No. 4,241,457 discloses a protective garment comprising segmented plates. The plates of the first and second layers have the same dimensions but are staggered with respect to one other.

U.S. Pat. No. 2,723,214 discloses a material suitable for use in protective clothing that has three segmented layers of plates, each mounted on a layer of elastic material. The segments of the plate facing the impact side have a smaller surface area than the segments of the underlying plates, and are so arranged that the junctions at their edges or joints do not fall directly above and parallel to any of the joints in the directly neighboring layer.

Requirements placed on the protection to be provided by armor plating are becoming increasingly stringent, and it is entirely possible that, for a dispersion pattern in the form of an equilateral triangle, shorter side lengths will be required in future. In fact side lengths as low as 45 mm have recently been discussed.

SUMMARY OF THE INVENTION

The object of the present invention, therefore, is to provide a composite armor-plating material showing improved multihit behavior that also meets requirements for a dispersion pattern with reduced dispersion.

This object is achieved with a composite armor-plating material comprising at least: a front layer, facing the impact side and mounted on a first sub-layer, the front layer consisting of a plurality of neighboring front-layer segments with form fit contact between adjacent segments; a rear layer facing away from the impact side; and a supporting layer, disposed between the front layer and the rear layer and consisting of a plurality of supporting-layer segments, wherein the supporting-layer segments present a surface, parallel to the front layer, whose area is the same as or less than the area of the front-layer segments parallel to the front layer, and wherein the supporting-layer segments are arranged underneath the front-layer segments in such a way that their edges are exactly superposed.

DESCRIPTION OF PREFERRED EMBODIMENTS

It is possible in this case to place under each front-layer segment a supporting-layer segment of the same area as the front-layer segment so that their edges are exactly superposed. Alternatively, a group of two or more supporting-layer segments can also be placed under a front-layer segment, the group having the same total area as the front-layer segment, and the edges of the group as a whole and those of the front-layer segment being exactly superposed.

The first sub-layer for the front-layer segments can consist of a fiber-reinforced plastic of low thickness, such as an aramid laminate, a glass-fiber reinforced plastic, or a polyethylene laminate. The preferred material is an arachnid laminate consisting of, for example, two or three layers of woven aramid yarn embedded in an elastomer matrix.

A single laminated woven layer may also be used. The front-layer segments may be affixed to the sub-layer with an adhesive, such as a polyurethane-based adhesive. The supporting-layer segments may also be mounted on a sub-layer. This could consist of, for example, fiber-reinforced plastic, plastic sheeting or a glass fabric, which could advantageously be provided with self-adhesive on one side so that the supporting-layer segments can be affixed to it directly. It is also possible, however, to dispense with a separate sub-layer for the supporting-layer segments, and to affix these directly to the rear layer with, e.g., an adhesive. The material for the rear layer, also known as the backing, may be a fibrous composite, in particular an aramid laminate. This consists of a plurality of layers of woven aramid yarn that are coated on one or both sides with an elastomeric material, a resin such as phenolic resin, or a thermoplastic material, and then laminated together.

Figure 3:
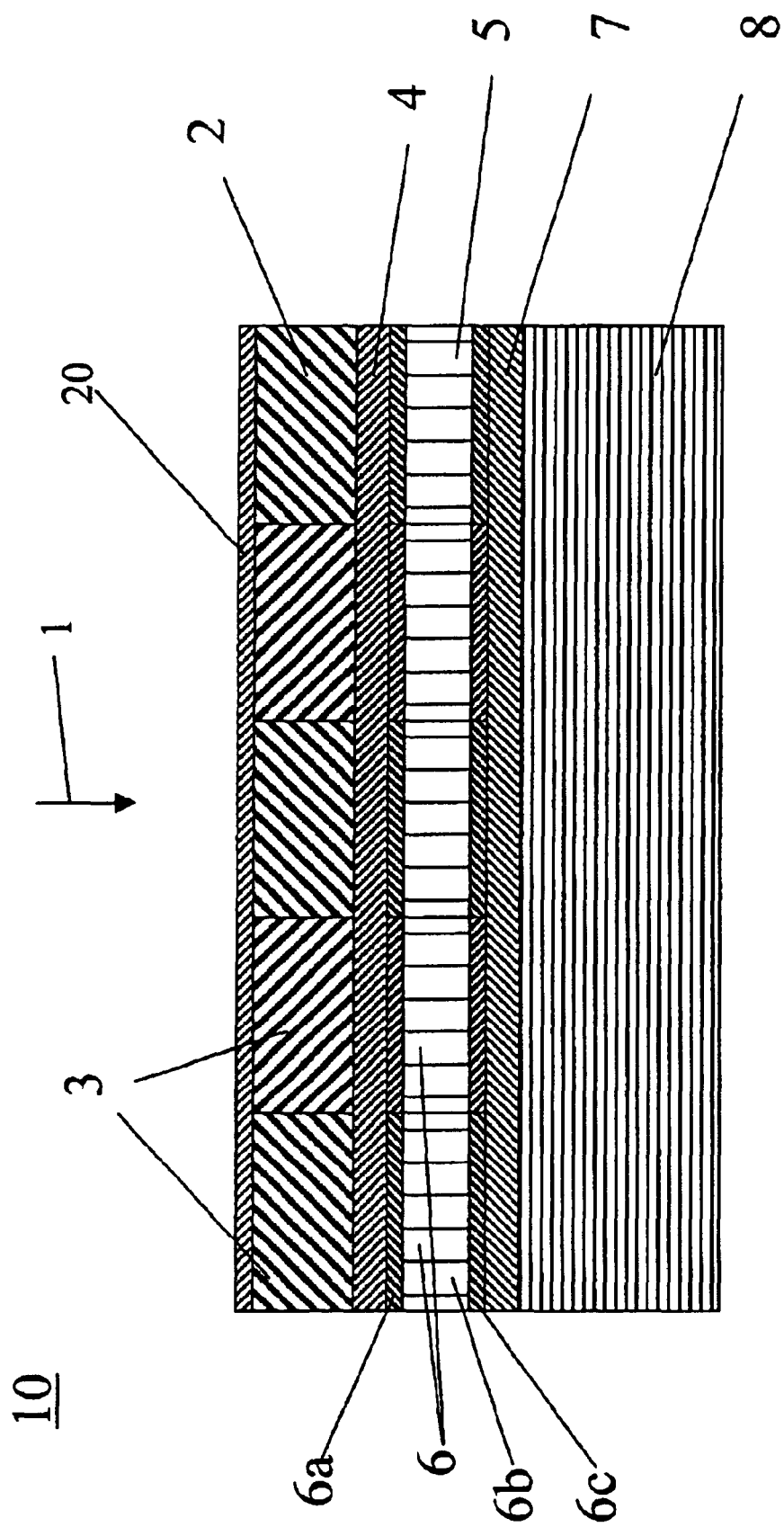
FIG. 3 is a diagrainatic representation of the cross-section of a composite armor-plating material of the invention that includes a covering layer and a honeycomb structure.

The front-layer segments may be provided with a covering layer (20 in FIG. 3) on the side facing the direction of impact; this may take the form of a coating of aluminum, glass or aramid fabric laminated onto the front layer.

The first sub-layer with the front-layer segments, which may be provided with a covering layer, can be affixed with adhesive to the supporting-layer segments mounted on the second sub-layer; the second sub-layer can be similarly affixed with adhesive to the rear layer.

The front-layer segments are preferably ceramic tiles. In the case of square tiles, their dimensions should lie between 20 mm×20 mm and 100 mm×100 mm, preferably between 20 mm×20 mm and 50 mm×50 mm. Triangular, hexagonal or rectangular tiles may also be used. If square tiles are used of which the cross-sectional area for the side facing the direction of impact is, e.g., 30 mm×30 mm, the supporting-layer segments are, according to the invention, also square and of dimensions 30 mm×30 mm. However, they may also have a smaller area than the tiles so that, for example, two segments of the supporting layer, each having a cross-sectional area of 15 mm×30 mm, may be fitted under a tile of size 30 mm×30 mm. It is also possible to fit more than two supporting-layer segments under a single tile, e.g., three segments, each of size 10 mm×30 mm, under a tile of size 30 mm×30 mm. If the tiles constituting the front layer, and the supporting-layer segments, are of equal size, a particularly advantageous embodiment of the invention is one in which each segment of the supporting layer is positioned directly under a tile such that the edges of the supporting-layer segment and those of the tile are exactly superposed. Each tile is therefore associated with exactly one supporting-layer segment, which has no direct contact with other tiles.

If supporting-layer segments are used that are smaller than the tiles, their dimensions should be chosen such that the total area of the supporting-layer segments that are combined into a group corresponds to the area of one tile, and that the group of supporting-layer segments can be so arranged under a tile that the edges of the group and those of the tiles are exactly superposed. In this way, every tile is associated with a group of supporting-layer segments that has no direct contact with other tiles.

It has been shown that in multiple bombardment of conventional armor plating consisting of a layer of ceramic tiles mounted on a backing, the second or third shot is not withstood when the dispersion is small, even if the individual shots do not impact the same ceramic tile. This is due to the fact that the backing bulges after the very first shot, so that neighboring ceramic tiles no longer have the necessary stability or support from the backing to withstand a further shot. As stated above, it has been suggested in the prior art that a reinforcing layer be placed under the front layer to serve as a supporting layer. It has been shown, however, that even this is insufficient to withstand a shot with a dispersion pattern in the form of an equilateral triangle with a side length of less than around 50 mm, for example. This problem is surprisingly solved by the object of the invention.

If the front-layer segments are not ceramic tiles but segments of extremely hard steels, the problem of unsatisfactory multihit behavior becomes less important, because structures of this type are better at withstanding multiple bombardment as compared with ceramic-tile structures. However, structures in which a steel is used as the front-layer material have the disadvantage of being appreciably heavier than ceramic structures. In this respect, also, the invention offers an advantage. Owing to the segmented supporting layer of the invention that is positioned between the front layer and the backing, the thickness of the steel segments forming the front layer can be reduced without any deterioration in multihit behavior, and with the added advantage of a reduction in weight.

For the purposes of the invention, the supporting-layer segments should consist of a rigid, lightweight material. A particularly suitable material is one consisting of thin upper (6a in FIG. 3) and lower (6b in FIG. 3) plates connected to each other by bridging elements in a honeycomb structure (6c in FIG. 3). These materials, also used in aircraft construction, are distinguished by light weight combined with high rigidity. Honeycomb structures of this type usually consist of such materials as aluminum, paper or plastics reinforced with aramid or carbon fibers or glass fibers. In addition to materials with honeycomb structure, a solid material, such as a solid plastic plate of, e.g., polycarbonate or a wooden plate, may also be used for the supporting-layer segments. The thickness of the supporting-layer segments should be between 2 mm and 10 mm.

In what follows, the invention will be described in more detail with the help of figures and examples.

Figure 1:
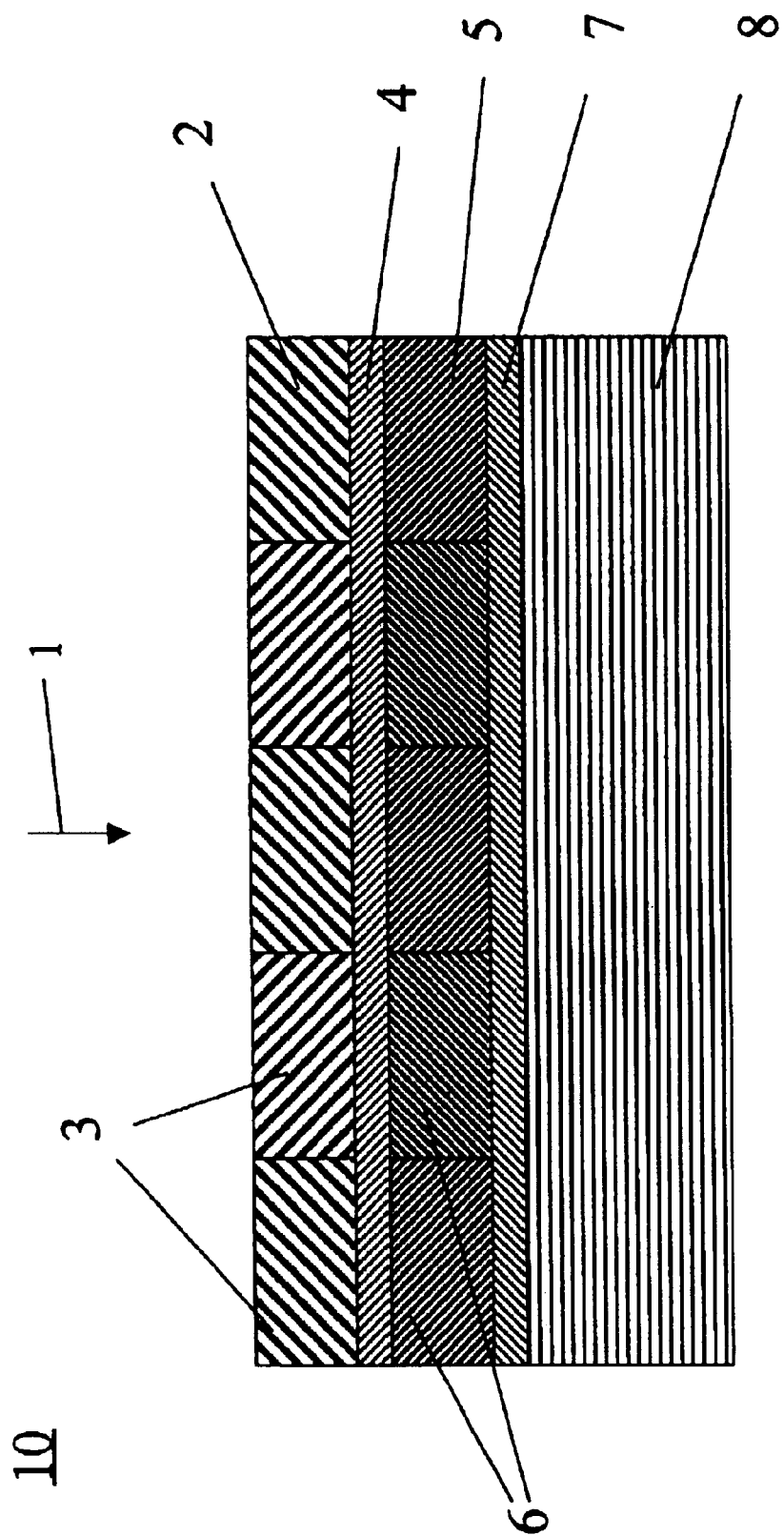
FIG. 1 is a diagrammatic representation of the cross-section of a composite armor-plating material of the invention.

In FIG. 1, the number 10 indicates a composite armor-plating material of the invention. This consists of a front layer 2 that faces the direction of impact (denoted here by the arrow 1) and that is made up of a plurality of front-layer segments 3, neighboring segments abutting one other. The front-layer segments 3 are mounted on a first sub-layer 4. The number 5 represents a supporting layer that, according to the invention, comprises supporting-layer segments 6. The supporting-layer segments 6 are mounted on a second sub-layer 7. Following the second sub-layer 7 is the rear layer or backing 8, which faces away from the impact side 1.

Figure 2:
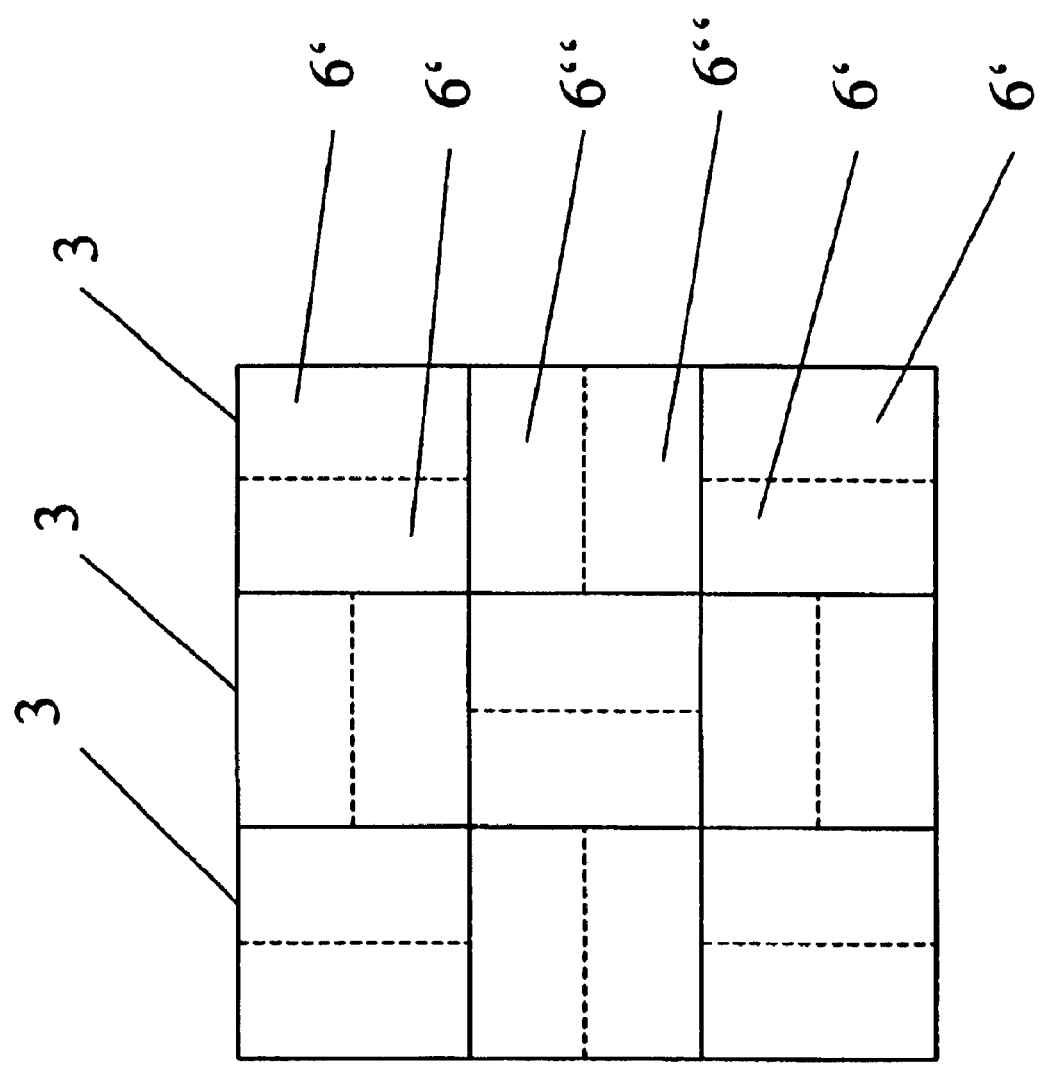
FIG. 2 is a top view of the front layer.

FIG. 2 is a top view of the front layer 2 in the direction of the arrow 1 of FIG. 1. The front layer 2 is constructed from, e.g., nine square front-layer segments 3. The first sub-layer 4 for the front-layer segments 3 is not shown in the figure in order to show how the supporting-layer segments 6' and 6" can for example be arranged relative to the front-layer segments 3. The area of the supporting-layer segments 6' and 6" is in every case half that of a front-layer segment 3. Two supporting-layer segments 6' are arranged under a front-layer segment 3 and two supporting-layer segments 6" under the neighboring front-layer segment, in an alternating pattern. The supporting-layer segments 6' and 6" are at an angle of 90° to each other. The two supporting-layer segments 6' form a group and are so arranged under a front-layer segment 3 that the group and the front-layer segment 3 are exactly superposed. The same applies for the two supporting-layer segments 6".

EXAMPLE 1

The penetration-resistance properties of a composite armor plating material of the invention were tested in accordance with DIN EN 1522. The composite material consisted of an 8.5 mm thick ceramic structure of tiles of dimensions 30 mm×30 mm, on a first sub-layer comprising a two-layer aramid laminate of TWARON® T750 woven fabric, and a 5 mm thick honeycomb structure which was in the form of 30 mm×30 mm segments. These supporting-layer segments were affixed to a layer of self-adhesive glass fabric serving as a sub-layer. The backing consisted of an 18-layer aramid laminate (TWARON® T750 laminate, rubberized). The thickness of the composite material was 24.5 mm and the mass per unit area was 471.9 g/dm².

The test was carried out under the following conditions.

| | |
|---|---|
| Caliber: | 7.62 mm × 51 |
| Bullet type: | VMS/HK (FNB) (full metal jacket spitzer bullet with hard core) |
| Bullet mass: | 9.75 g |
| Weapon: | Messlauf, twist length 254 mm |
| Barrel length: | 658 mm |
| Range: | 10.00 m |
| Additional conditions: | Dispersion 1/2 = 40 mm<br>Dispersion 1/3 = 40 mm<br>Dispersion 2/3 = 35 mm |

| No. | Velocity V (7.50) | Energy E (7.50) | Penetration |
|---|---|---|---|
| 1 | 824 m/s | 3310 J | no |
| 2 | 828 m/s | 3342 J | no |
| 3 | 825 m/s | 3318 J | no |

The above data confirm that even at very low dispersion where No. 1 and No. 3 moreover entered at a seam, such hits being particularly difficult to stop, the composite armor-plating material of the invention possesses outstanding properties and meets the requirements of resistance class FB7-NS as specified in DIN EN 1522.

EXAMPLE 2

The penetration-resistance properties of a second composite armor-plating material of the invention were tested in accordance with DIN EN 1522. The composite material consisted of a 9 mm thick ceramic structure of 25 mm×25 mm tiles, mounted on a first sub-layer comprising a two-layer aramid laminate, and a 5 mm thick honeycomb material of Corlight in the form of 25 mm×25 mm segments. The honeycomb material consisted of an upper and a lower plate of glass fabric, between which paper honeycombs were arranged. These supporting-layer segments were affixed to a layer of self-adhesive glass fabric serving as a sub-layer. The backing consisted of an 18-layer aramid laminate. The tiles were provided with a layer of glass-fiber woven fabric on the impact side. The thickness of the composite material was 25 mm and the mass per unit area was 501.2 g/dm².

The test was carried out under the following conditions.

| | |
|---|---|
| Caliber: | 7.62 mm × 51 |
| Bullet type: | HK FNB (full metal jacket spitzer bullet with hard core) |
| Bullet mass: | 9.75 g |
| Weapon: | Messlauf, twist length 254 mm |
| Barrel length: | 658 mm |
| Range: | 10.00 m |
| Additional conditions: | Dispersion 1/2 = 35 mm<br>Dispersion 1/3 = 35 mm<br>Dispersion 2/3 = 32 mm |

| No. | Velocity V (7.50) | Energy E (7.50) | Penetration |
|---|---|---|---|
| 1 | 817 m/s | 3254 J | no |
| 2 | 820 m/s | 3278 J | no |
| 3 | 821 m/s | 3286 J | no |

Despite the extremely low dispersion, the composite armor-plating material of the invention in Example 2 also shows outstanding properties and meets the requirements of resistance class FB7-NS as specified in DIN EN 1522.

COMPARISON EXAMPLE

The penetration-resistance properties of a composite armor-plating material were tested in accordance with DIN EN 1522. The composite material consisted of an 8.5 mm thick ceramic structure of 30 mm×30 mm tiles, on a first sub-layer consisting of a two-layer aramid laminate, and a 5 mm thick honeycomb that was not segmented. The backing consisted of an 18-layer aramid laminate. The tiles were provided with a layer of glass-fiber/epoxy on the impact side. The thickness of the composite was 24.4 mm and the mass per unit area was 463.4 g/dm².

The test was carried out under the following conditions.

| | |
|---|---|
| Caliber: | 7.62 mm × 51 |
| Bullet type: | VMS/HK (FNB) (full metal jacket spitzer bullet with hard core) |
| Bullet mass: | 9.75 g |
| Weapon: | Messlauf, twist length 254 mm |
| Barrel length: | 650 mm |
| Range: | 10.00 m |
| Additional conditions: | Dispersion 1/2 = 40 mm<br>Dispersion 1/3 = 40 mm<br>Dispersion 2/3 = 40 mm |

| No. | Velocity V (7.50) | Energy E (7.50) | Penetration |
|---|---|---|---|
| 1 | 855 m/s | 3310 J | no |
| 2 | 828 m/s | 3342 J | yes |
| 3 | 818 m/s | 3262 J | no |

The armor-plating material of the comparison example did not show penetration for a dispersion pattern in the form of an equilateral triangle of side length 120 mm. Nevertheless, the above data show that a composite armor-plating material with a protective layer that is, however, not segmented, shows unsatisfactory penetration-resistance properties at low dispersion and therefore does not possess the required favorable multihit properties.

What is claimed is:
1. Composite armor-plating material comprising at least: a front layer, facing an impact side and mounted on a first sub-layer, the front layer comprising a plurality of neighboring front-layer segments with form-fit contact between adjacent segments; a rear layer facing away from the impact side; and a supporting layer disposed between the front layer and the rear layer and comprising a plurality of supporting-layer segments, where each of the supporting-layer segments present a surface parallel to the front layer, which surface has a surface area that is the same as or less than a surface area of a surface of each of the front-layer segments parallel to the front layer, where the supporting-layer segments are so arranged underneath the front-layer segments that edges of the supporting-layer segments and edges of the front-layer segments are exactly superposed, and wherein the first sub-layer bearing the front-layer segments is affixed with adhesive to the supporting-layer segments, which supporting layer segments are mounted on a second sub-layer, and wherein the second sub-layer is affixed with adhesive to the rear layer.

2. Composite armor-plating material according to claim 1, wherein one of the plurality of supporting-layer segments arranged under each front-layer segment and has a surface having a same surface area as a surface of the front-layer segment.

3. Composite armor-plating material according to claim 1, wherein a group of two or more of the plurality of supporting-layer segments are placed under one of the plurality of front layer segments, the group having a same total surface area as a surface of the front-layer segment, and edges of the group and edges of the front-layer segment are exactly superposed.

4. Composite armor-plating material according to claim 1, wherein the first sub-layer for the front-layer segments comprises a fiber-reinforced material.

5. Composite armor-plating material according to claim 4, wherein the first sub-layer comprises an aramid laminate, a glass-fiber reinforced plastic or a polyethylene laminate.

6. Composite armor-plating material according to claim 1, wherein the supporting-layer segments are mounted on the second sub-layer.

7. Composite armor-plating material according to claim 6, wherein the second sub-layer for the supporting-layer segments comprises a fiber-reinforced plastic, plastic sheeting or a glass fabric.

8. Composite armor-plating material according to claim 1, wherein the front-layer segments are ceramic tiles or small steel plates.

9. Composite armor-plating material according to claim 1, wherein the front-layer segments and the supporting-layer segments are square, rectangular, triangular or hexagonal in shape.

10. Composite armor-plating material according to claim 1, wherein the supporting-layer segments are made of a rigid material.

11. Composite armor-plating material according to claim 1, wherein the supporting-layer segments comprise a honeycomb structure disposed between an upper and a lower thin plate.

12. Composite armor-plating material according to claim 1, wherein the rear layer comprises a fibrous composite.

13. Composite armor-plating material according to claim 1, wherein the rear layer comprises an aramid laminate.

14. Composite armor-plating material according to claim 1, wherein the front-layer segments are affixed with adhesive to the first sub-layer and wherein the supporting-layer segments are affixed with adhesive to the second sub-layer.

15. Composite armor-plating material according to claim 1, wherein the front-layer segments are provided with a covering layer on the impact side.

* * * * *

UNITED STATES PATENT AND TRADEMARK OFFICE
CERTIFICATE OF CORRECTION

PATENT NO. : 6,792,843 B2
DATED : September 21, 2004
INVENTOR(S) : Michael Mohr, Carsten Geitz and Jorg Wintersieg It is certified that error appears in the above-identified patent and that said Letters Patent is hereby corrected as shown below:

<u>Column 1,</u>
Line 22, delete "is".

<u>Column 2,</u>
Line 40, change "diagraimatic" to -- diagrammatic --.

Signed and Sealed this

Thirty-first Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,792,843 B2
APPLICATION NO. : 10/276070
DATED : September 21, 2004
INVENTOR(S) : Michael Mohr, Carsten Geitz and Jorg Wintersieg It is certified that error appears in the above-identified patent and that said Letters Patent is hereby corrected as shown below:

On the cover page of the patent, please insert:

(30) Foreign Application Priority Data
May 11, 2000 (DE) 10023181.0

Signed and Sealed this

Seventeenth Day of April, 2007

JON W. DUDAS
*Director of the United States Patent and Trademark Office*